United States Patent [19]
Darwish et al.

[11] Patent Number: 6,068,105
[45] Date of Patent: May 30, 2000

[54] LOW IMPACT ARTICLE DIVERTER ASSEMBLY

[75] Inventors: Raed Y. Darwish, Grapevine; Richard Patrick, Denton, both of Tex.

[73] Assignee: Mannesmann Dematic Rapistan Corp., Grand Rapids, Minn.

[21] Appl. No.: 08/933,818

[22] Filed: Sep. 19, 1997

[51] Int. Cl.[7] .................................................. B65G 47/46
[52] U.S. Cl. ....................................................... 198/370.02
[58] Field of Search ........................... 198/370.02, 370.07

[56] References Cited

U.S. PATENT DOCUMENTS

| | | | |
|---|---|---|---|
| 3,026,988 | 3/1962 | Fisk | 198/24 |
| 3,045,801 | 7/1962 | Graybeal | 198/24 |
| 3,246,733 | 4/1966 | Torbet et al. | 198/185 |
| 4,298,117 | 11/1981 | Kobayashi et al. | 198/367 |
| 4,441,604 | 4/1984 | Schlig et al. | 198/598 |
| 4,643,291 | 2/1987 | Counter et al. | 198/356 |
| 5,010,998 | 4/1991 | MacMillan | 198/372 |
| 5,217,104 | 6/1993 | Pelletier | 198/367 |
| 5,452,786 | 9/1995 | Gilmore | 198/367 |

FOREIGN PATENT DOCUMENTS

| | | | |
|---|---|---|---|
| 2242457 | 4/1973 | Germany | 198/367 |
| 2620036 | 11/1977 | Germany | 198/367 |
| 36820 | 3/1983 | Japan . | |
| 58-036820 | 3/1983 | Japan . | |
| 232320 | 11/1985 | Japan | 198/367 |

OTHER PUBLICATIONS

PCT Search Report based on PCT Patent application corresponding to U.S. patent application, Serial No. 08/933,818.

*Primary Examiner*—James R. Bidwell
*Attorney, Agent, or Firm*—Van Dyke, Gardner, Linn & Burkhart, LLP

[57] ABSTRACT

A pusher assembly for diverting the flow of articles on a conveyor includes a pusher arm that provides smooth engagement of the articles with minimal impact and a return path of the pusher which travels through the space previously occupied by the article being sorted. Consequently, the pusher assembly enables minimum spacing between articles on the conveyor and increases the sortation rate of the pusher assembly. The pusher assembly includes a pusher and a driver, which is coupled to the pusher. The driver moves the pusher from an initial retracted position adjacent the conveyor to a first diverting position, wherein the pusher pivots about a point spaced downstream from a downstream end of the pusher so that an upstream end of the pusher moves into contact with the side of the article. The driver further moves the pusher such that the pusher pivots about the upstream end so that the downstream end of the pusher rolls and moves into contact with the side of the article. The driver then pivots the pusher about an intermediate portion such that the upstream end of the pusher moves out of the path of on coming articles and the downstream end continues to push against the side of the articles to rotate the article in a direction substantially orthogonal to the flow of the conveyor. This movement is followed by the driver pivoting the pusher in an opposite direction about the intermediate portion to disengage the pusher from the article and to return the pusher to its initial retracted position.

48 Claims, 8 Drawing Sheets

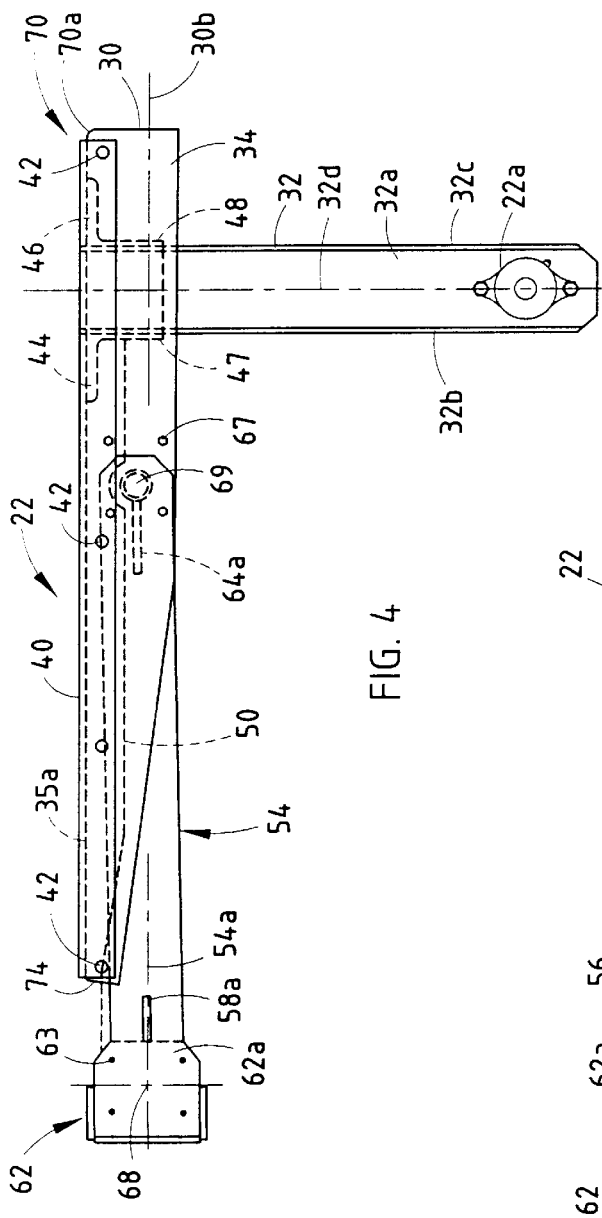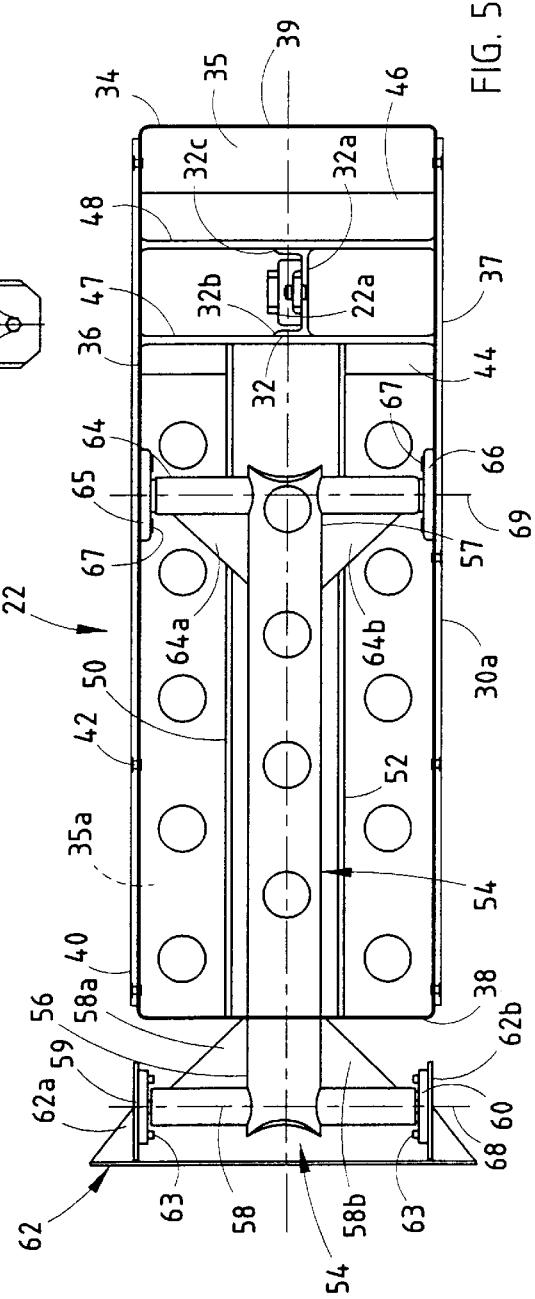

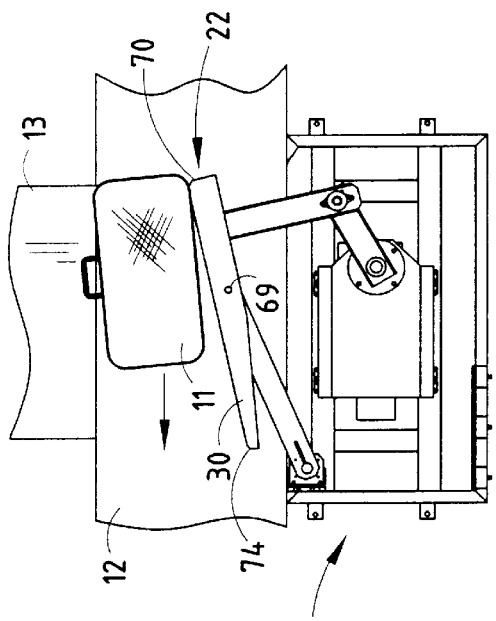
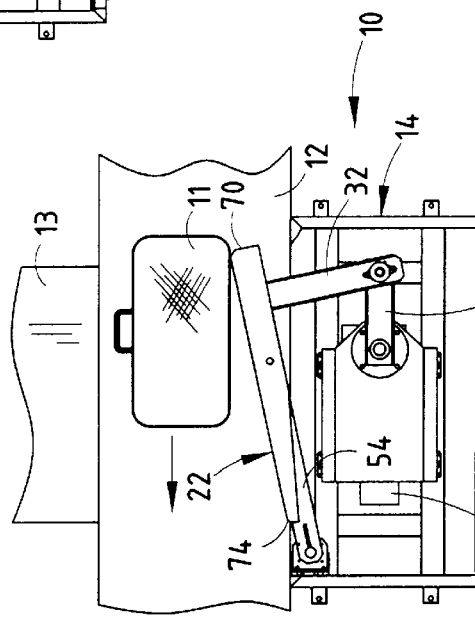
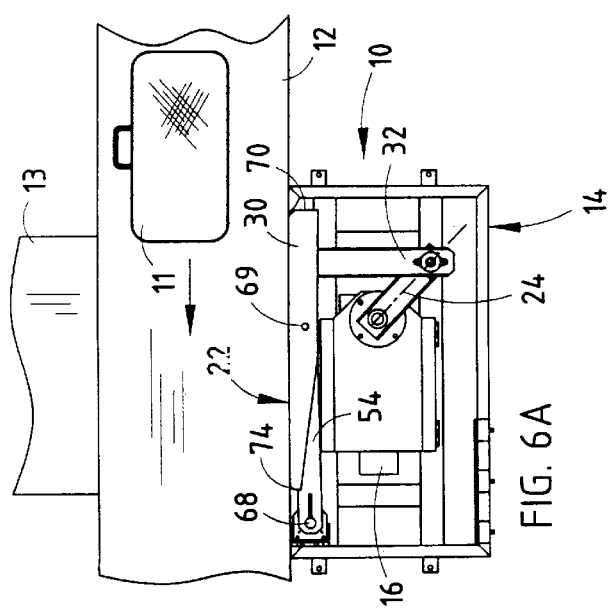

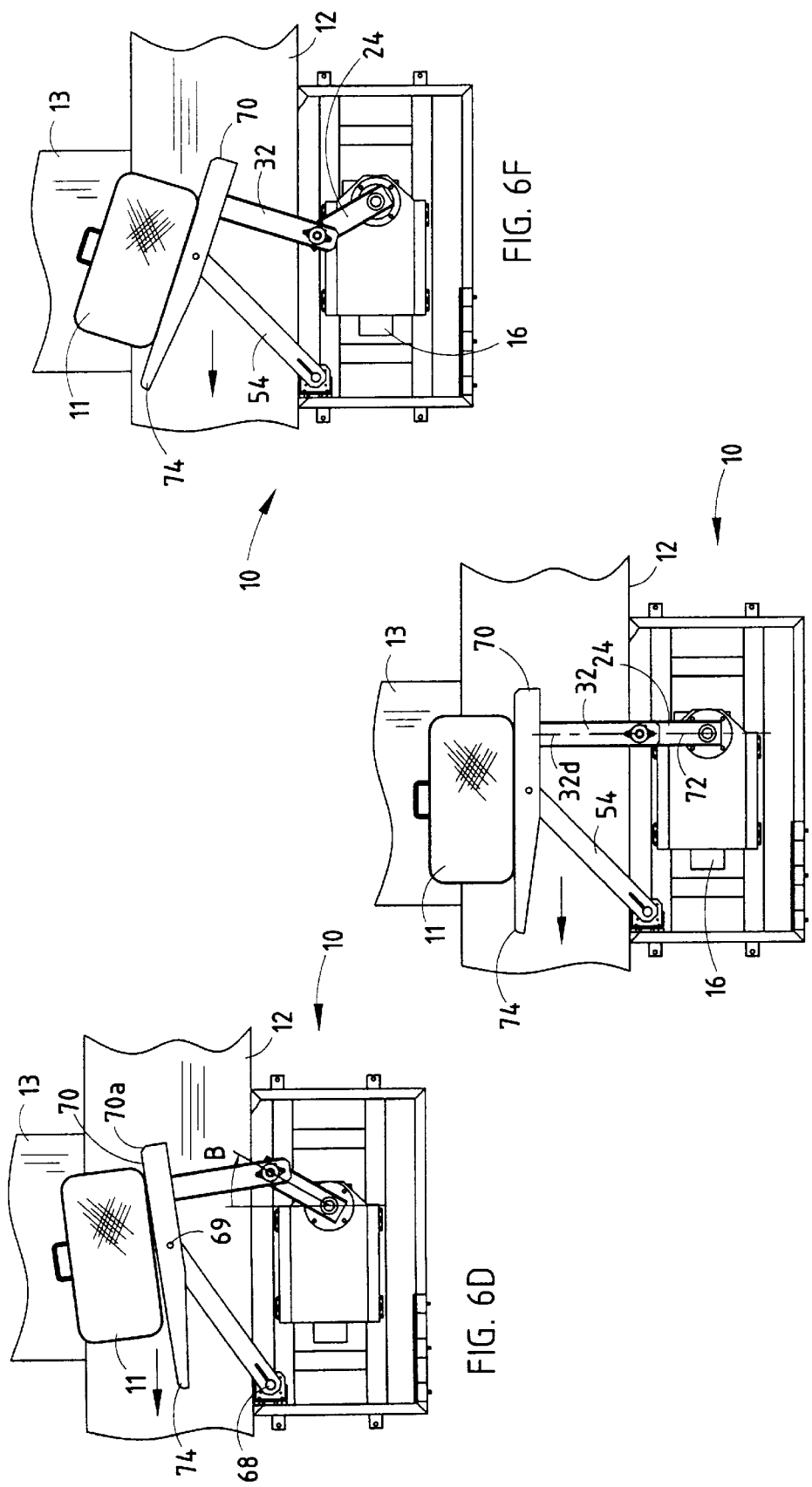

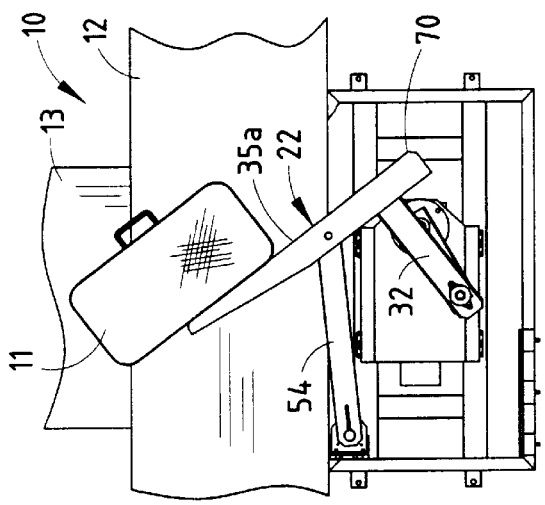
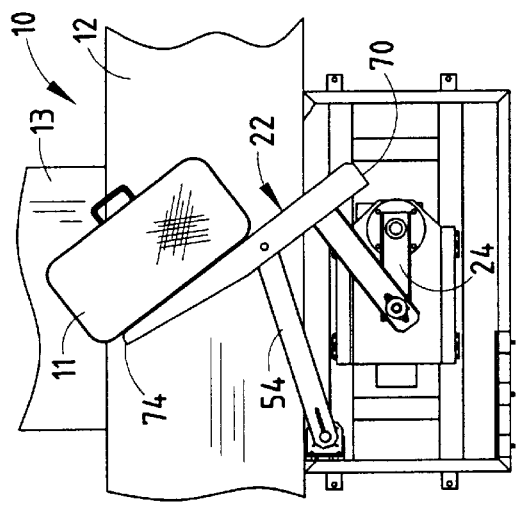
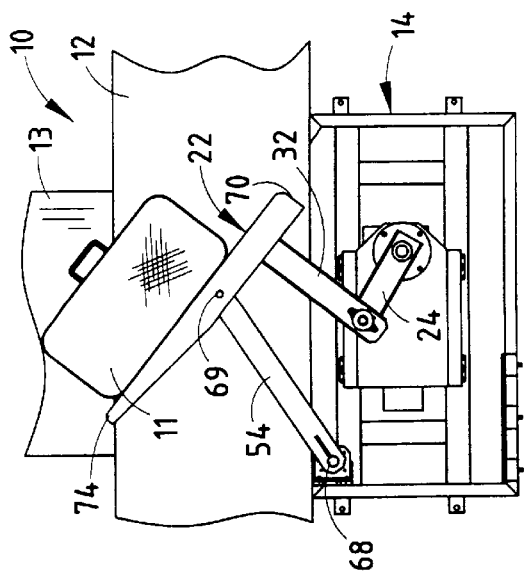

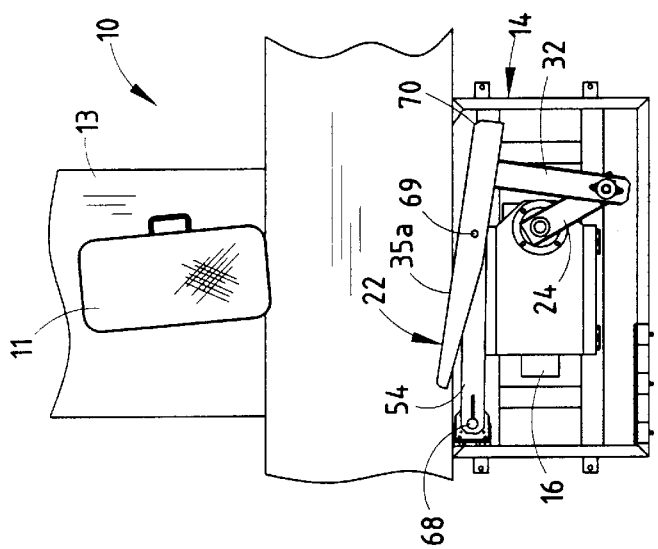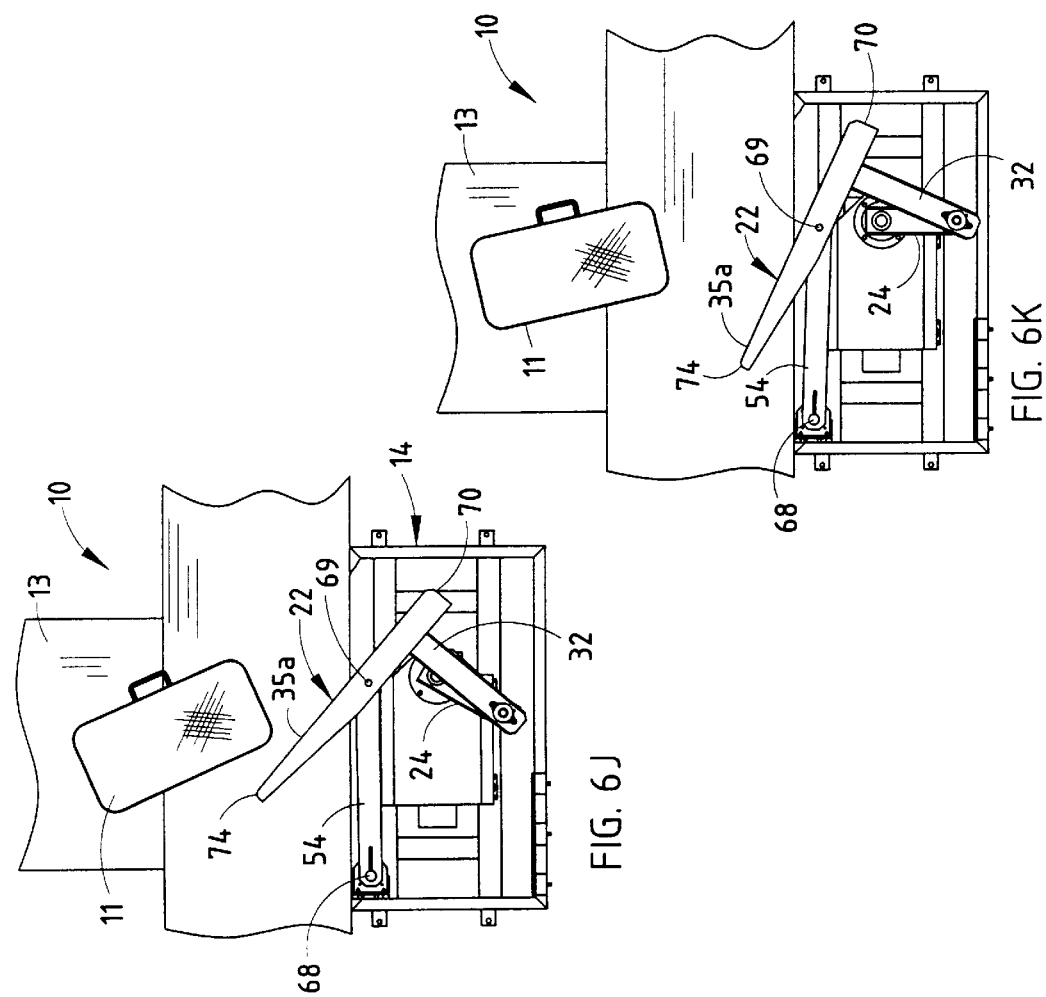

LOW IMPACT ARTICLE DIVERTER ASSEMBLY

TECHNICAL FIELD AND BACKGROUND OF THE INVENTION

The present invention relates to an article handling device and, more, particularly to an article diverter assembly for diverting articles being transported on a conveyor. The article diverter assembly of the present invention is particularly suitable for use in a baggage handling system.

Conventional pusher assemblies include an arm and a driver that moves the arm into the path of the oncoming articles to divert the articles on the conveyor in a direction generally orthogonal to the flow of the articles. Most conventional pusher assemblies provide an angled abutment surface onto which downstream end of the article being diverted impacts. This diverting action, therefore, relies on the forward momentum of the article. Typical diverter assemblies include two strokes: The first stroke pushes the arm into the path of the articles on the conveyor, and the second stroke is a return stroke in which the pusher moves out of the path of oncoming articles. In order to increase the diverting or sortation speeds, therefore, these pusher assemblies must cycle through the two stokes at higher speeds. As the speed increases, the impact on the article increases—in other words, the sortation rate and the magnitude of the impact are directly proportional. Consequently, in applications requiring low impact, current diverter assemblies can not operate at high diverting or sortation rates.

For example, in U.S. Pat. No. 4,643,291 to Counter, a conventional two stroke linear pusher assembly is disclosed. The linear pusher assembly includes a paddle and a pusher, which pushes the paddle back and forth across the conveyor. Furthermore, the paddle pivots between an initial retracted position adjacent to the conveyor and an angled position so that on-coming articles, which impact the paddle, slide along the angled paddle to be redirected transversely across the conveyor. However, the Counter pusher assembly contacts the downstream forward end of the articles and relies on the angle of the paddle and the momentum of the article to divert the article. Therefore, with greater conveyor speeds the impact of the article on the paddle may be substantial. Moreover, because the paddle extends in a straight line across the conveyor, the Counter pusher assembly requires greater spacing between the articles on the conveyor to avoid impact with the oncoming articles.

In U.S. Pat. No. 5,010,998 to MacMillan, a pusher assembly is described in which a diverter member is mounted on a linkage for movement in and out of the path of the articles transported on a conveyor. The diverter member is first pivoted about a medial portion of the diverter member so that the downstream end of the diverter member contacts the downstream forward end of one of the articles on the conveyor. Again, the pusher assembly relies on the momentum of the article bearing against the angled surface of the diverter member to redirect the flow of the article.

Therefore, there is a need for pusher assemblies that can offer a high speed sortation rate while producing minimal impact to the articles being diverted on a conveyor.

SUMMARY OF THE INVENTION

The present invention provides a pusher assembly that operates at a high speed and includes a pusher arm that provides a smooth engagement of packages being conveyed on a conveyor to redirect the flow of the packages on the conveyor. The pusher arm is designed to move a wide variety of items of varying weights and sizes. The pusher arm is driven in a cycloidal path over the belt of the conveyor, which produces minimal velocity through the impact zone and, therefore, imparts minimal impact to the items being diverted on the conveyor. Moreover, the pusher arm contacts the side of the article so that forward momentum of the article is conserved. The return path of the pusher arm travels through the space previously occupied by the item being sorted and, thus, enables minimum spacing between articles on the conveyor. Consequently, the pusher assembly of the present invention increases the sortation rate of the system without the corresponding increase in impact on the articles associated with conventional pusher assemblies.

According to one aspect of the present invention, a pusher assembly includes a pusher and a driver, which is coupled to the pusher. The driver pivots the pusher a point spaced downstream from a downstream end of the pusher and moves an upstream end of the pusher in an arcuate path from an initial retracted position to a first diverting position. The driver then pivots the pusher about the upstream end of the pusher and moves the pusher to a second diverting position. The driver then pivots the pusher about an intermediate portion of the pusher in a first direction and moves the pusher to a third diverting position. The driver then pivots the pusher in an opposite direction about the intermediate portion to return the pusher to the initial retracted position adjacent the conveyor.

In one form, the pusher comprises an L-shaped pusher member with a pusher arm and a motion imparting arm. The driver is coupled to the motion imparting arm. Preferably, the driver includes a motor, for example a brake motor. The driver may further include a driver arm coupling the motor to the motion imparting arm.

In other forms, the pusher assembly further includes a linkage member having a first end and a second end. The first end of linkage member is pivotally coupled to a fixed member, for example a rigid frame, and the second end is pivotally coupled to the intermediate portion of the pusher. In one form, the point which is spaced downstream from the downstream end of the pusher is defined by the first end of the linkage member. In this manner, linkage member guides the movement of the pusher through a cycloidal path as defined by the initial retracted position and the first, second, and third diverting positions.

In another aspect, pusher assembly includes a pusher and a driver, which is coupled to the pusher. The driver moves the pusher in a cycloidal path and moves the pusher in an arcuate path from an initial retracted position to a first diverting position for extending the pusher across a conveyor and for moving an upstream end of the pusher into contact with the side of at least one article being transported on the conveyor. The driver then pivots the pusher about the upstream end of the pusher for aligning the pusher with the side of the article. The driver further pivots the pusher about an intermediate portion of the pusher in a first direction for rotating the article and then pivots the pusher about the intermediate portion in an opposite direction from the first direction for disengaging the pusher from the article and for moving the pusher out of the path of the articles on the conveyor until the pusher is returned to its initial retracted position adjacent the conveyor.

According to another aspect of the invention, a pusher assembly includes a pusher, which includes a longitudinal axis and upstream and downstream ends, and a linkage member, which includes a longitudinal axis and first and second ends. The longitudinal axis of the linkage member is substantially parallel with the longitudinal axis of the pusher when the pusher is in an initial retracted position adjacent the conveyor. The first end of linkage member is adapted to pivotally couple to a fixed member, and the second end is pivotally coupled to the pusher. The pusher assembly further includes a driver, which is coupled to the pusher. The driver initially pivots the pusher and the linkage member about the first end of the linkage member such that the upstream end of the pusher moves across the conveyor for engaging the side of one of the articles and for pushing the article laterally across the conveyor. The driver then pivots the pusher about the second end of the linkage member for rolling the pusher against the article. As the driver continues to move the pusher, the upstream end of the pusher moves out of the path of the oncoming articles, which is then followed by the driver pivoting the pusher in an opposite direction about the second end of the linkage to return the pusher to its initial retracted position adjacent the conveyor.

In one form, the second end of the linkage member is pivotally connected to an intermediate portion of the pusher which is located between a medial portion of the pusher and the upstream end of the pusher.

According to yet another aspect, a pusher assembly includes a frame, a pusher having upstream and downstream ends, and a linkage member. The linkage member includes a first end and a second end, with the first end pivotally connected to the frame. The second end is pivotally connected to an intermediate portion of the pusher arm, and the first end of the linkage member is spaced downstream of the downstream end of the pusher when the pusher is in an initial retracted position adjacent a conveyor. The pusher assembly further includes a driver coupled to the pusher. The driver moves the pusher in a cycloidal path over the conveyor for diverting articles on the conveyor in a direction substantially orthogonal to the flow of the articles on the conveyor.

In one form, the driver initially pivots the pusher and the linkage member about the first end of the linkage member followed by the pusher pivoting about the second end of the linkage member. In this manner, the upstream end of the pusher first moves into contact with the side of the article, which is then followed by the pusher rolling against the side of the article.

These and other objects, advantages, and features of this invention will become apparent upon reviewing the following specification in conjunction with the drawings.

BRIEF DESCRIPTION OF THE DRAWINGS

FIG. 4 is a plan view of a pusher member of the pusher assembly;

FIG. 5 is a side elevational view of the pusher member of FIG. 4; and

FIGS. 6A–6L illustrate a sequence of plan views of the pusher assembly as the pusher member moves through a cycloidal path across a conveyor.

DETAILED DESCRIPTION OF THE PREFERRED EMBODIMENTS

Figure 1:
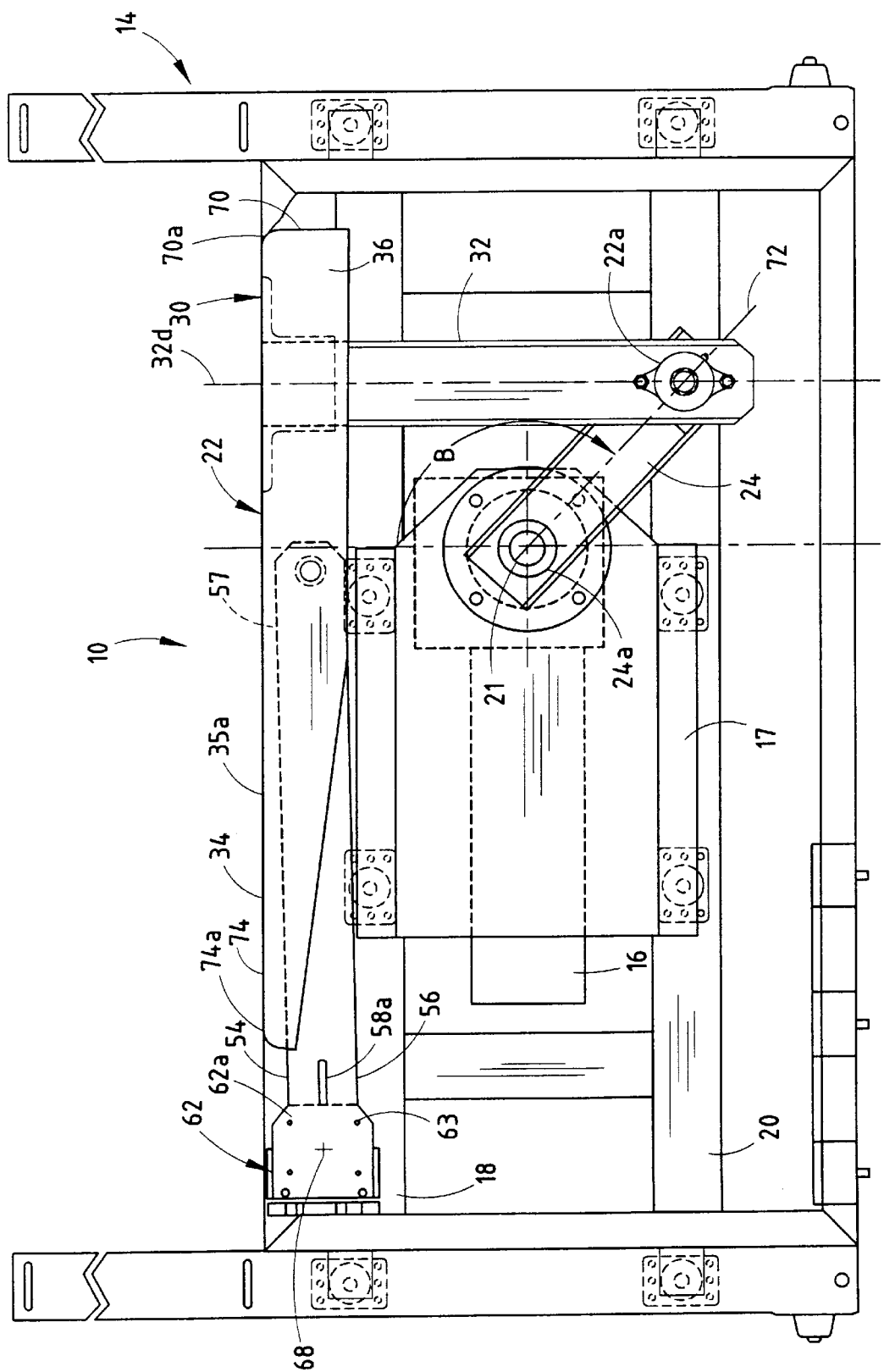
FIG. 1 is a top plan view of a pusher assembly according to the present invention with a pusher member of the pusher assembly in a retracted position.
Figure 2:
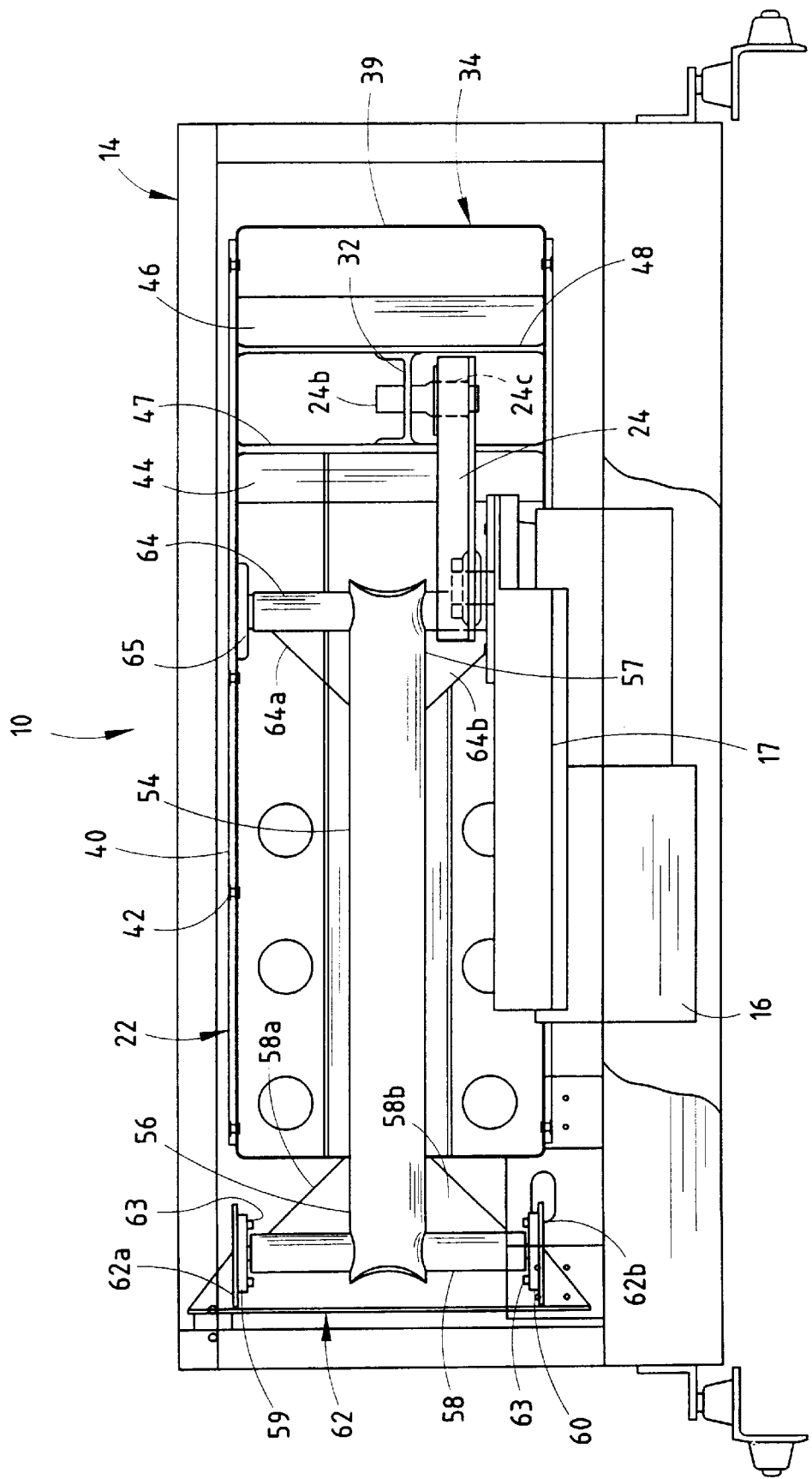
FIG. 2 is a side elevational view of the pusher assembly of FIG. 1.

Referring now specifically to the drawings and the illustrated embodiments depicted therein, the numeral 10 generally designates a pusher assembly which is especially suited for diverting the flow of articles 11 on a conveyor 12 to a take-away device 13, such as a take-away conveyor or delivery chute (FIGS. 6A–6L). Pusher assembly 10 is designed for positioning adjacent conveyor 12 which conveys articles 11 from an upstream portion to a downstream portion of conveyor 12 in the direction as indicated by the arrow shown in FIGS. 6A–6L. As such, pusher assembly 10 is particularly useful for sorting a variety of articles, such as baggage at an airport or containers on a conveyor in a warehouse.

Figure 3:
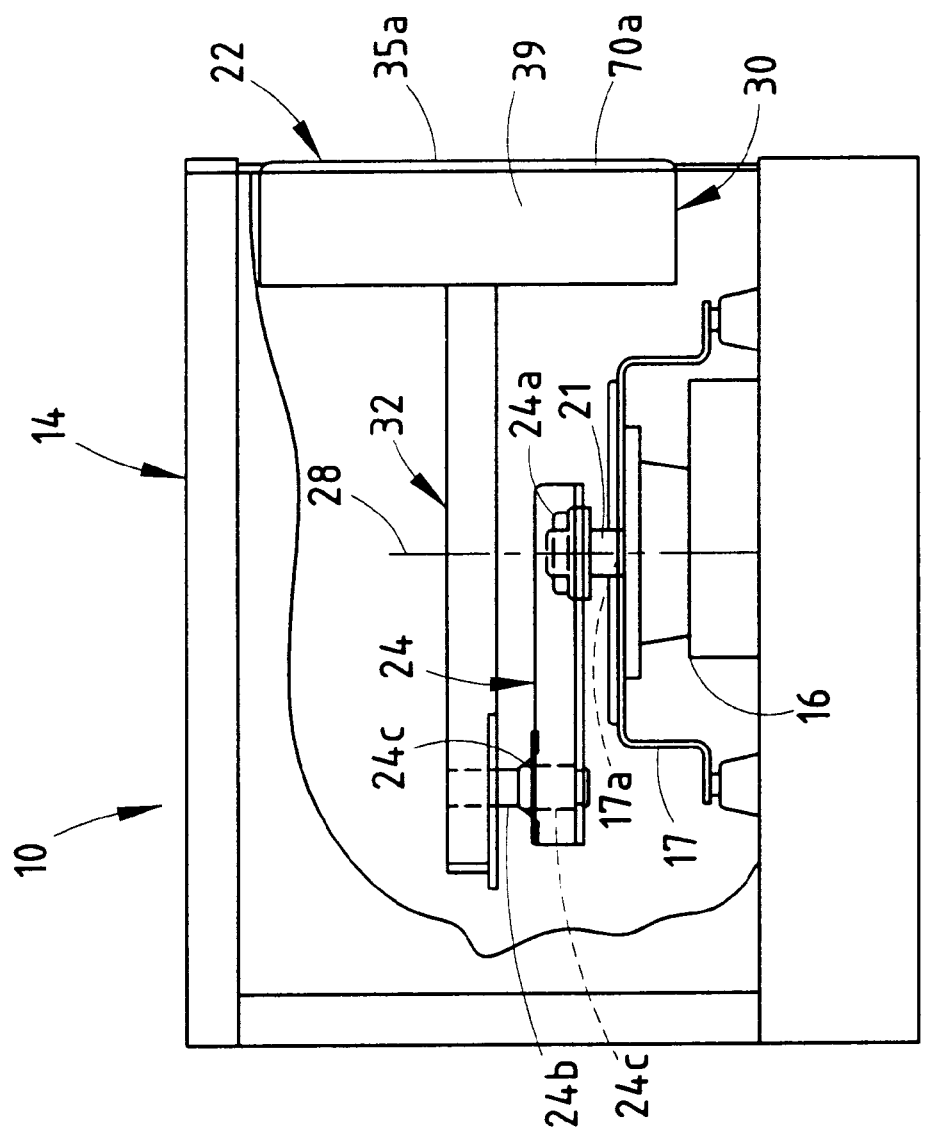
FIG. 3 is an end side elevational view of the pusher assembly of FIG. 1.

As best seen in FIG. 1, pusher assembly 10 includes a frame 14 and a motor 16 which is supported on frame 14 by a mounting bracket 17. Frame 14 may include a cover (not shown) to protect people and to protect pusher assembly 10 from inadvertently jamming in the event that an article becomes lodged between the moving parts of the pusher assembly. Mounting bracket 17 extends between and is mounted to two transverse members 18 and 20 of frame 14 to provide a rigid support for motor 16. Motor 16 is preferably a high speed brake motor with an auxiliary cooling fan built into the motor housing. Motor 16 includes a right angled drive shaft 21, which extends through an opening 17a provided in mounting bracket 17 (FIG. 3) to drive a pusher member 22. Motor drive shaft 21 is drivingly coupled to pusher member 22 by a driving arm 24, which is drivingly coupled to motor drive shaft 21 on one end through a bushing 24a. Driving arm 24 is pivotally coupled to pusher member 22 at its other end by a pin 24b which is secured to driver arm 24 by a collar 24c and extends into a corresponding bushing 22a (FIGS. 4 and 5) mounted on pusher member 22.

It can be understood from the illustrations, when motor 16 is operating, motor drive shaft 21 rotates about a vertical axis 28 (FIG. 3) and, consequently, moves or drives driver arm 24 in a circular path either in a clockwise direction or counter clockwise direction. As shown in the sequence in FIGS. 6A–6L, driver arm 24 preferably rotates in a counter clockwise direction about axis 28. But it should be understood, if pusher member 22 is arranged on the other side of frame 14 to accommodate a different conveyor arrangement, driver arm 24 may be driven in a clockwise direction. The rotary motion of driver arm 24 drives pusher member 22 in a cycloidal path across conveyor 12, as will be more fully described below. In this manner, pusher member 22 gently pushes articles 11, which are transported on conveyor 12 in the direction designed by an arrow in FIGS. 6A–6L, in a generally orthogonal direction with respect to the direction of flow to take-away conveyor or chute 13.

Referring to FIGS. 1, 4 and 5, pusher member 22 is generally L-shaped and includes a pusher arm 30 and a motion imparting arm 32, which are arranged and secured together in a generally orthogonal orientation to each other. Pusher arm 30 comprises a channel shaped member 34 with closed ends having a web 35, upper and lower flanges 36 and 37, and end flanges 38 and 39. Web 35 preferably includes a substantial vertical extent so that web 35 can push articles having a relatively high center of gravity without over turning the articles. However, it should be understood that the vertical extent of web 35 may be varied as needed depending on the application. Preferably, in order to reduce the weight of pusher arm 30, channel shaped member 34 is made from a light weight, load bearing material, such as aluminum. Outer surface 35a of web 35 provides a bearing or article engaging surface and is preferably covered with an impact absorbing cover 40, such as a foam sheet. More preferably, outer surface 35a is covered with a blended PVC foam sheet, which includes an adhesive back surface for adhering cover 40 to outer surface 35a of pusher arm 30. Furthermore, cover 40 may be secured to upper and lower flanges 36 and 37 using fasteners 42, such as bolts, screws, rivets, and the like.

Extending between upper and lower flanges 36 and 37 of pusher arm 30 are a pair of spaced angle members 44 and 46, which are preferably welded or otherwise secured to the back surface 35b of web 35 and/or to upper and lower flanges 36 and 37. Angle members 44 and 46 provide a rigid mount for motion imparting arm 32 to channel shaped member 34, which is welded or otherwise rigidly secured to legs 47 and 48 of angle members 44 and 46, respectively. Furthermore, angle members 44 and 46 provide increased local stiffness to channel member 34 so that the forces from motion imparting arm 32 are distributed across channel shaped member 34 to increase the effective cross-section. Extending between end flange 38 and leg 47 of angle member 44 are a pair of reinforcing plates 50 and 52, which are welded or otherwise rigidly secured to web 35 and to end flange 38 and leg 47 in order to provide reinforcement of channel member 34.

In the illustrated embodiment, motion imparting arm 32 is channel shaped and includes a web 32a and flange portions 32b and 32c, which are welded or otherwise rigidly secured to legs 47 and 48 of angle members 44 and 46, respectively. It should be understood that motion imparting arm 32 may comprise other structural shapes and may be rigidly secured to pusher arm 30 using other suitable, conventional methods. Driver arm 24 is preferably pivotally coupled to the free end of motion imparting arm 32 and pivotally mounted to web 32a of motion imparting arm 32 by pin 24b and bushing 22a, such that driver arm 24 clears flanges 32b and 32c of motion imparting arm 32 to permit a full three hundred and sixty degree range of motion between driver arm 24 and motion imparting arm 32.

Pusher assembly 10 further includes a linkage member 54 having first and second ends 56 and 57. As best seen in FIG. 5, first end 56 of linkage member 54 includes a pivot pin 58, which extends transversely through first end 56 and is reinforced by gusset plates 58a and 58b. Pivot pin 58 is pivotally mounted to frame 14 by a bracket 62 between a pair of pivot blocks 59 and 60. Pivot blocks 59 and 60 are rigidly secured to respective flanges 62a and 62b of bracket 62 by suitable fasteners 63, such as bolts, screws, rivets, or the like or welding. Similar to first end 56, second end 57 includes a pivot pin 64 which extends transversely through second and 57 and is reinforced by gusset plates 64a and 64b. Pivot pin 64 is pivotally mounted to an intermediate portion of pusher arm 22 between pivot blocks 65 and 66. Preferably, pivot blocks 65 and 66 are rigidly mounted to upper and lower flanges 36 and 37, respectively, of channel member 34 by conventional fasteners 67, for example bolts, screws, rivets, or the like, or by welding.

As best seen in FIGS. 1 and 5, linkage member 54 is pivotally mounted to frame 14 at a distance spaced from the distal end of pusher arm 22 to define a first axis of rotation 68. Furthermore, linkage member 54 is pivotally mounted to pusher arm 30 at the intermediate portion of pusher arm 30 between a medial portion 30a of pusher arm 30 and the connection between the second end of driver arm 24 and the pusher arm 30, thereby defining a second axis of rotation 69. Furthermore, the longitudinal axis 54a of the linkage member 54 is substantially parallel with the longitudinal axis 30b of pusher arm 30 when pusher arm 22 is in its initial retracted position adjacent conveyor 12 (FIGS. 1 and 4).

Consequently, with the arrangement of pusher member 22, linkage member 54, and driver arm 24 described above, motor 16, which drives driver arm 24 in a circular motion, moves pusher member 22 such that pusher member 22 pivots first about first axis of rotation 68, then pivots pusher member 22 about second end 57 of linkage member 54, then pivots pusher member 22 about second axis of rotation 69 in a first direction, and then pivots pusher member 22 in a second, opposed direction about second axis of rotation 69 to thereby define the compact, cycloidal movement of pusher member 22.

In order to better describe and define the cycloidal movement of pusher member 22, reference will be made to the three hundred and sixty degrees of a circle, with the zero and the three hundred and sixty degree angle represented by driver arm 24 aligned in a twelve o'clock position illustrated in FIG. 6E, and the driver arm angle $\beta$ defined as the angle between the zero angle position and driver arm 24 as measured from the zero angle in a counter clockwise direction (FIGS. 1 and 6D).

Referring to FIG. 6A, when pusher member 22 is in its initial retracted position adjacent conveyor 12, driver arm angle $\beta$ is approximately one hundred and thirty two degrees and bearing surface 35a of pusher arm 30, longitudinal axis 30a of pusher arm 30, and longitudinal axis 54a of linkage member 54, are substantially parallel with the edge of conveyor 12. When motor 16 initially drives driver arm 24 in a counter clockwise direction as seen in FIG. 6B, driver arm 24 imposes a force on motion imparting arm 32 which resolves into a compressive force component and bending moment component on motion imparting arm 32 and a bending moment component and a tension force component on pusher arm 30. This results in pusher member 22 bearing against linkage member 54 and inducing rotation of linkage member 54 about first end 56 of linkage member 54 or about first axis of rotation 68 in a counter clockwise direction. Therefore, pusher arm 30 and linkage member 54 pivot in unison about axis 68 with pusher arm 30 moving in an arcuate path across conveyor 12 to define a first motion (FIGS. 6A–6B) in which pusher member 22 moves from its initial retracted position adjacent conveyor 12 to a first diverting position.

In this first motion, an upstream end 70 of pusher arm moves into the path of articles 11 being transported on conveyor 12 (FIG. 6B). Preferably, upstream end 70 of pusher arm 30 engages the side of one of the articles (11) on conveyor 12 to gently push the article 11, to urge article 11 across conveyor 12 in a direction that is substantially orthogonal to the flow of the articles on the conveyor. As a result, the impact force on article 11 is minimal and is significantly less than in a conventional diverter in which the pusher engages the downstream end of the articles and blocks the path of the article, using the article's forward momentum to redirect the flow of the article. As best seen in FIG. 1, upstream end 70 and downstream end 74 of pusher arm 30 each preferably includes a rounded or tapered corner 70a and 74a, respectively, so that when contact is made with article 11 pusher member 22 will have a desired minimum contact surface area for engaging article. In this manner, by eliminating sharp corners on pusher arm 30, pusher member 22 will not induce unacceptable local stresses on article 11.

Referring to FIGS. 6C–6E, as motor 16 continues to rotate driver arm 24 about axis 68 and shortly after upstream end 70 engages the side of article 11, driver arm 24 reaches a second position where driver arm angle $\beta$ is approximately sixty degrees. In this second position, driver arm 24 pivots pusher member 22 about upstream end 70 of pusher arm 30 in a clockwise direction. Furthermore, pusher arm 30 pivots with respect to linkage member 54 about second axis of rotation 69, where linkage member 54 is pivotally coupled to pusher arm 30. Pusher member 22 pivots at a slow angular speed thereby defining a second motion. In this second motion, the pusher member 22 moves from the first diverting position to a second diverting position wherein pusher member 30 effectively rolls against the side of article 11 and continues to impart minimal impact on the side of article 11. As pusher member 22 pivots about the connection between linkage member 54 and pusher arm 30, pusher arm 30 rolls against article 11 until engaging surface 35a of pusher arm 30 is parallel and, preferably, in contact with the side of article 11. At this point (FIG. 6E), longitudinal axis 72 of driver arm 24 is substantially collinear with the longitudinal axis 32d of motion imparting arm 32 of pusher member 22.

Further counter clockwise rotation of driver arm 24 induces rotation of pusher member 22 about second axis of rotation 69 in a clockwise direction so that pusher member 22 moves to a third diverting position and rotates article 11 in a clockwise direction, as seen in FIGS. 6F–6I, thereby defining a third motion. This third motion corresponds to driver arm 24 rotating from about a negative thirty degree or a three hundred and thirty degree driver angle (β) to a negative one hundred and twenty degree angle or a two hundred and forty degree driver arm angle (β), respectively. In this third motion, downstream end 74 of pusher member 22 moves in an arcuate path across conveyor 12 while pusher arm 30 remains in contact with the side of article 11. At the same time conveyor 12 continues to move article 11 in the general direction of flow causing article 11 to slide along engaging surface 35a while pusher member 22 rotates article 11 in a clockwise direction toward take-away device 13. In this third motion, upstream end 70 of pusher arm 22 moves out of the path of the articles on the conveyor. After pusher member 22 has diverted article 11 from its original path on conveyor 12 and redirected article 11 such that at least half of article 11 is positioned on take-away device 13, take-away device 13 will thereafter control the direction of the flow of article 11.

It should be understood that when an article is being conveyed along a conveyor and is delivered to a take-away device, such as a take-away conveyor, the article must generally be positioned more than half-way onto the take-away conveyor before the frictional forces between the take-away conveyor are sufficient to take control of the article. In a similar manner, when an article is transported on a conveyor and is to be redirected down a chute, generally slightly more than half of the article must be positioned over the edge of the conveyor and directed into the chute for the gravitational forces acting on the article to move the article from the conveyor down the chute. Therefore, the length of pusher arm 30 and reach of pusher member 22 must be sufficient to move article 11 such that at least half of article 11 is on take-away conveyor 13. The position of pusher member 22 in FIG. 6J corresponds with article 11 having greater than half of its weight on take-away conveyor 13 or over the edge of conveyor 12.

Referring to FIGS. 6J–6L, driver arm 24 continues to rotate in its counter clockwise direction until pusher member 22 deposits article 11 on the take way conveyor 13. When pusher arm 24 reaches a driver angle of about two hundred and forty degrees, pusher member 22 pivots about second axis of rotation 69 in a counter clockwise direction to disengage pusher arm 30 from article 11, thereby defining a fourth or return path motion. Pusher member's 22 return path includes pusher member 22 being pivoted about second axis of rotation 69 to return pusher member 22 to its initial retracted position adjacent conveyor 12. When pusher member 22 returns to its initial retracted position, pusher member 22 travels through the same space that was previously occupied by the article (11). In this manner, the articles (11) on conveyor 12 can be closely spaced to thereby increase the diverting or sortation rate.

It should be understood from the foregoing description that the configuration of the driver arm, motion parting arm, pusher arm, and linkage member results in four distinct ranges of motion for the pusher member. The first motion or movement includes pusher member 22 pivoting about first axis 68 with upstream end 70 of pusher arm 30 traversing across the conveyor in an arcuate path to engage the side of article 11. The second motion or movement comprises pusher member 22 pivoting about upstream end 70, thereby moving the downstream end 74 of pusher arm 30 in an arcuate path across conveyor 12 to roll pusher arm 30 against article 11 so that pusher arm 30 is aligned along the side of the article. The third motion or movement comprises pusher member 22 rotating about axis 69 with upstream end 70 moving out of the path of article 11 on the conveyor and pusher arm 30 pivoting article 11 in a direction generally orthogonal to the flow of the conveyor and toward take-away conveyor 13. The fourth motion or movement includes pusher member 22 disengaging from article 11 and pivoting in a counter clockwise direction about axis 69 to move pusher member 22 back to its initial position wherein pusher arm 30 is generally parallel to the edge and the direction of flow of the conveyor.

In this manner, the first contact of the pusher arm 30 with article 11 through the last contact of the pusher member with the article consist of low impact engagements, which reduce the risk of damage to the articles on the conveyor. Furthermore, the motion or movement of pusher member 22 travels through the space occupied by the article on the conveyor so that only minimal spacing is required between each article. The pusher member provides a smooth engagement with the packages with a minimal velocity through the impact zone, and yet can perform up to 80 sorts per minute. This high rate of sorting can be attributed to the fact that the pusher arm travels through the space previously occupied by the item sorted in its return path back to its initial position adjacent the conveyor belt 12 and the pusher arm does not significantly reduce the momentum of the article.

Furthermore while one form of the invention has been shown and described, other forms will now be apparent to those skilled in the art. For instance, pusher arm, driver arm and motion imparting arm may comprises numerous structural shapes and suitable materials. Furthermore, frame 14 may comprise structural members arranged in a plurality of different configurations. Moreover, frame 14 may be anchored to a floor or platform or suspended. For the purposes of the foregoing description, such terms, for example, "counter clockwise," "clockwise," and "vertical" and derivatives or equivalents, that relate to orientation are provided fro convenience to described the invention as oriented in FIGS. 1–6L only. It is understood that the invention may assume various alternative orientations, except where expressly specified to the contrary. It is also understood that the specific illustrations shown in drawings and described in the preceding specification, are simply exemplary embodiments of the inventive concepts defined in the appended claims. Hence, specific dimensions, including angular dimensions, and other physical characteristics relating to the embodiments disclosed herein are not to be considered limiting unless the claims expressly state otherwise. The embodiment of the invention shown in the drawings is not intended to limit the scope of the invention which is defined by the claims which follow.

The embodiments of the invention in which we claim exclusive property or privilege are defined as:

1. A pusher assembly for diverting articles on a conveyor, the conveyor moving the articles from an upstream portion of the conveyor to a downstream portion of the conveyor, said pusher assembly comprising:

a pusher having upstream and downstream ends and an intermediate portion between said upstream end and said downstream end;

a driver coupled to said pusher, said driver initially pivoting said pusher about a point spaced downstream from said downstream end of said pusher and moving said pusher in an arcuate path from an initial retracted position to a first diverting position whereby said upstream end initially contacts an article for moving the article laterally across the conveyor, said driver then pivoting said pusher about said upstream end of said pusher and moving said pusher to a second diverting position, said driver then pivoting said pusher about said intermediate portion in a first direction and moving said pusher to a third diverting position, and said driver then pivoting said pusher about said intermediate portion in an opposite direction from said first direction to return said pusher to said initial retracted position.

2. A pusher assembly according to claim 1, wherein said pusher comprises an L-shaped pusher member, said L-shaped pusher member having a pusher arm and a motion imparting arm, said pusher arm including said upstream end and said downstream end, and said driver being coupled to said motion imparting arm.

3. A pusher assembly according to claim 1, wherein said driver includes a motor.

4. A pusher assembly according to claim 3, wherein said motor comprises a brake motor.

5. A pusher assembly according to claim 3, wherein said driver further includes a driver arm drivingly coupled to said motor, said motor moving said driver arm in a circular path in one of a clockwise direction and a counter clockwise direction.

6. A pusher assembly for diverting articles on a conveyor, the conveyor moving the articles from an upstream portion of the conveyor to a downstream portion of the conveyor, said pusher assembly comprising:

a pusher having upstream and downstream ends and an intermediate portion between said upstream end and said downstream end;

a linkage member having a first end and a second end, said first end being adapted to pivotally couple to a fixed member, and said second end being pivotally coupled to said intermediate portion of said pusher; and a driver coupled to said pusher, said driver pivoting said pusher about a point spaced downstream from said downstream end of said pusher and moving said pusher in an arcuate path from an initial retracted position to a first diverting position, said driver then pivoting said pusher about said upstream end of said pusher and moving said pusher to a second diverting position, said driver then pivoting said pusher about said intermediate portion in a first direction and moving said pusher to a third diverting position, and said driver then pivoting said pusher about said intermediate portion in an opposite direction from said first direction to return said pusher to said initial retracted position.

7. A pusher assembly according to claim 6, wherein the point spaced downstream from said downstream end of said pusher comprises said first end of said linkage member.

8. A pusher assembly according to claim 6, wherein said pusher comprises an L-shaped pusher member.

9. A pusher assembly according to claim 8, wherein said L-shaped pusher member includes a pusher arm and a motion imparting arm, said pusher arm including said upstream end and said downstream end, and said driver being coupled to said motion imparting arm.

10. A pusher assembly according to claim 6, wherein said driver includes a motor.

11. A pusher assembly for diverting articles on a conveyor, the conveyor moving the article from an upstream portion to a downstream portion of the conveyor and defining a direction of flow of the articles, said pusher assembly comprising:

a pusher having upstream and downstream ends and an intermediate portion between said upstream and downstream ends;

a driver coupled to said pusher, said driver moving said pusher in a cycloidal path, said driver moving said pusher an arcuate path from an initial retracted position to a first diverting position for extending said pusher across the conveyor and for moving said upstream end of said pusher into contact with a side of an article, followed by said driver pivoting said pusher about said upstream end of said pusher for aligning the pusher with a side of an article, followed by said driver pivoting said pusher about said intermediate portion in a first direction for rotating an article, then followed by said driver pivoting said pusher about said intermediate portion in an opposite direction from said first direction for disengaging said pusher from an article and for moving said pusher out of the path of articles on the conveyor until said pusher is returned to said initial retracted position.

12. A pusher assembly according to claim 11, said pusher having a longitudinal axis, said longitudinal axis of said pusher being adapted to be generally parallel with the direction of flow of articles on the conveyor when said pusher is in said initial retracted position.

13. A pusher assembly according to claim 11, wherein said driver includes a motor.

14. A pusher assembly according to claim 13, wherein said motor comprises a brake motor.

15. A pusher assembly according to claim 11, wherein said pusher is a generally L-shaped member having a first arm and a second arm, said driver being coupled to said second arm, and said first arm including said upstream end and said downstream end.

16. A pusher assembly according to claim 15, wherein said second arm includes a free end, said driver being coupled to said free end of said second arm.

17. A pusher assembly according to claim 16, wherein at least one of said upstream end and said downstream end of said first arm include one of a tapered portion and a rounded portion for engaging a side of an article.

18. A pusher assembly according to claim 15, said driver including a motor and a driver arm drivingly coupled to said motor, said driver arm pivotally coupled to said second arm.

19. A pusher assembly according to claim 18, said driver arm being driven by said motor to rotate in one of a counter clockwise direction and a clockwise direction.

20. A pusher assembly according to claim 11, further comprising a pusher frame and a linkage member, said linkage member having a first end and a second end, said first end of said linkage member being pivotally coupled to said pusher frame, said second end of said linkage member being pivotally coupled to said pusher at said intermediate portion, said linkage arm and said pusher pivoting about said first end of said linkage member when said driver moves said pusher in said arcuate path.

21. A pusher assembly according to claim 20, wherein said downstream end of said pusher includes a distal end, said linkage member being pivotally coupled to said pusher frame downstream from said downstream end of said pusher.

22. A pusher assembly according to claim 20, wherein said pusher includes first and second arms, said first arm having a medial portion, and said second end of said linkage member being pivotally coupled to said first arm intermediate said second arm and said medial portion of said first arm.

23. A pusher assembly for diverting articles conveyed on a conveyor, the conveyor having a direction of flow, the pusher assembly comprising:
   a frame;
   a pusher having upstream and downstream ends and an intermediate portion between said upstream end and said downstream end, said pusher being adapted to move from an initial retracted position wherein said pusher is adjacent the conveyor to at least one of three diverting positions;
   a linkage member having first and second ends, said first end being pivotally connected to said frame downstream of said downstream end of said pusher when said pusher is in said initial retracted position, said second end being pivotally connected to said intermediate portion of said pusher arm; and
   a driver coupled to said pusher, said driver moving said pusher in a cycloidal path from said initial retracted position to one of at least three diverting positions and initially pivoting said pusher about said first end of said linkage member when moving said pusher from said initial retracted position.

24. A pusher assembly according to claim 23, wherein said pusher includes a substantially planar pushing surface.

25. A pusher assembly according to claim 24, wherein said pusher includes spaced upper and lower flanges extending from said substantially planar pushing surface, said linkage member being pivotally connected to said pusher by a pin member, said pin member extending between and being coupled to said upper and lower flanges of said pusher.

26. A pusher assembly according to claim 24, wherein said substantially planar pushing surface includes a cover for further reducing the impact between the pusher and the articles on the conveyor.

27. A pusher assembly according to claim 26, wherein said cover comprises a foam cover.

28. A pusher assembly according to claim 27, wherein said cover comprises a PVC foam cover.

29. A pusher assembly according to claim 23, wherein said pusher is a generally L-shaped member having a first arm and a second arm, said driver being pivotally coupled to said second arm, and said first arm including said upstream end and said downstream end.

30. A pusher assembly according to claim 29, said driver including a motor and a driver arm, said driver arm having a first end and a second end, said first arm of said driver arm being drivingly coupled to said motor, said motor driving said driver arm about said first end in one of a counter clockwise direction and a clockwise direction, and said second end of said driver arm being coupled to said pusher.

31. A pusher assembly according to claim 30, wherein said second end of said driver arm is pivotally coupled to said pusher by a pin.

32. A pusher assembly according to claim 23, wherein said driver initially pivots said pusher and said linkage member about said first end of said linkage member followed by said driver pivoting said pusher about said upstream end of said pusher.

33. A pusher assembly according to claim 23, wherein said pusher arm and said linkage member each having a longitudinal axis, said longitudinal axes of said pusher and said linkage member being substantially parallel when said pusher is in said initial retracted position.

34. A pusher assembly according to claim 23, wherein said driver initially moves said upstream end in an arcuate path from said initial retracted position to a first diverting position.

35. A pusher assembly according to claim 34, wherein said driver moves said pusher in an arcuate path from said first diverting position to a second diverting position.

36. A pusher assembly according to claim 23, wherein said driver includes a motor.

37. A pusher assembly for directing flow of articles transported on a conveyor, said pusher assembly comprising:
   a pusher having an upstream end and a downstream end;
   a motor drivingly coupled to said pusher; and
   a linkage member having a first end, an intermediate portion, and a second end, said first end of said linkage member being pivotally connected to said frame, said second end of said linkage member being pivotally coupled to said pusher, said motor driving said pusher and said downstream end of said pusher contacting and bearing against said intermediate portion of said linkage member, said pusher together with said linkage member pivoting about said first end of said linkage member from an initial retracted position to a diverting position thereby defining a first motion, said motor continuing to drive said pusher such that said pusher pivots about the pivotal connection between said pusher and said linkage member thereby defining a second motion, said motor pivoting said pusher about said second end of said linkage moving defining a third motion, and said motor pivoting said pusher about said second end of said linkage in an opposite direction from said third motion and returning said pusher to said initial retracted position thereby defining a fourth motion, wherein said first motion, said second motion, said third motion, and said fourth motion define a cycloidal path.

38. A pusher assembly according to claim 37, wherein said motor is drivingly coupled to said pusher by a driving arm, said motor moving said driving arm in one of a clockwise direction and a counter clockwise direction.

39. A pusher assembly according to claim 37, said linkage member and said pusher each including a longitudinal axis, said longitudinal axes of said linkage member and said pusher being substantially parallel when said pusher is in said initial retracted position.

40. A pusher assembly according to claim 37, wherein said pusher comprises a generally L-shaped member.

41. A pusher assembly according to claim 37, wherein said downstream end of said pusher is aligned between said first end and said second end of said linkage member when said pusher is in said initial retracted position.

42. A method diverting an article from a first conveyor to a take-away conveyor, the first conveyor transporting the article from an upstream end to a downstream end of the first conveyor, the article having a downstream end and a side, said method comprising the steps of:

providing a pusher, the pusher including an upstream portion and a downstream portion;

pushing a portion of the side of the article with the pusher in a generally lateral direction across the conveyor, wherein pushing the portion of the side of the article includes pushing the side of the article with the upstream end of the pusher;

rolling the pusher against the side of the article; and rotating the article in one of a counter clockwise direction and a clockwise direction while pushing the side of the article to direct the article toward the take-away conveyor.

43. The method according to claim 42, wherein rolling the pusher includes rotating the pusher about the upstream portion of the pusher while pushing the side of the article with upstream portion of the pusher.

44. The method according to claim 43, wherein rotating the article includes rotating the pusher about an intermediate portion of the pusher while pushing the article with the pusher.

45. The method according to claim 42, wherein pushing a portion of the side of the article includes rotating the pusher about a point downstream of the downstream end of the pusher to move the upstream end of the pusher from an initial retracted position into contact with the side of the article.

46. The method according to claim 45, wherein rolling the pusher includes rotating the pusher about the upstream end of the pusher while pushing the article.

47. The method according to claim 46, further including pivoting the pusher about an intermediate portion in a first direction to rotate the article.

48. The method according to claim 47, further including pivoting the pusher about the intermediate portion in an opposite direction from the first direction to return the pusher to the initial retracted position.

* * * * *

UNITED STATES PATENT AND TRADEMARK OFFICE
CERTIFICATE OF CORRECTION

PATENT NO. : 6,068,105
DATED : May 30, 2000
INVENTOR(S) : Raed Y. Darwish and Richard Patrick It is certified that error appears in the above-identified patent and that said Letters Patent is hereby corrected as shown below:

Title page,
Item [73], Assignee, "Minn." should be -- Mich. --

Column 8,
Line 57, "fro" should be -- for --

Column 13,
Line 7, insert -- of -- after "method"

Signed and Sealed this

First Day of February, 2005

JON W. DUDAS
*Director of the United States Patent and Trademark Office*